Patented Feb. 21, 1950

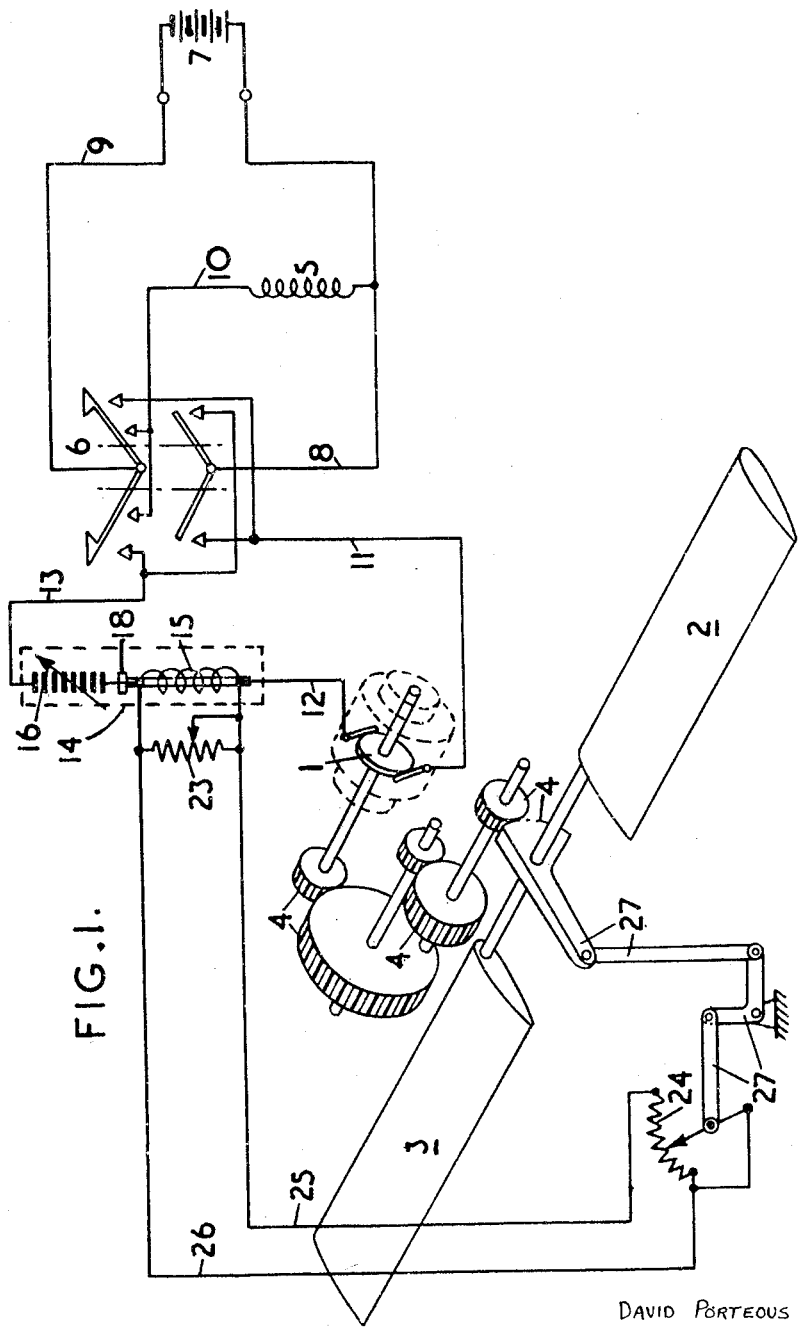

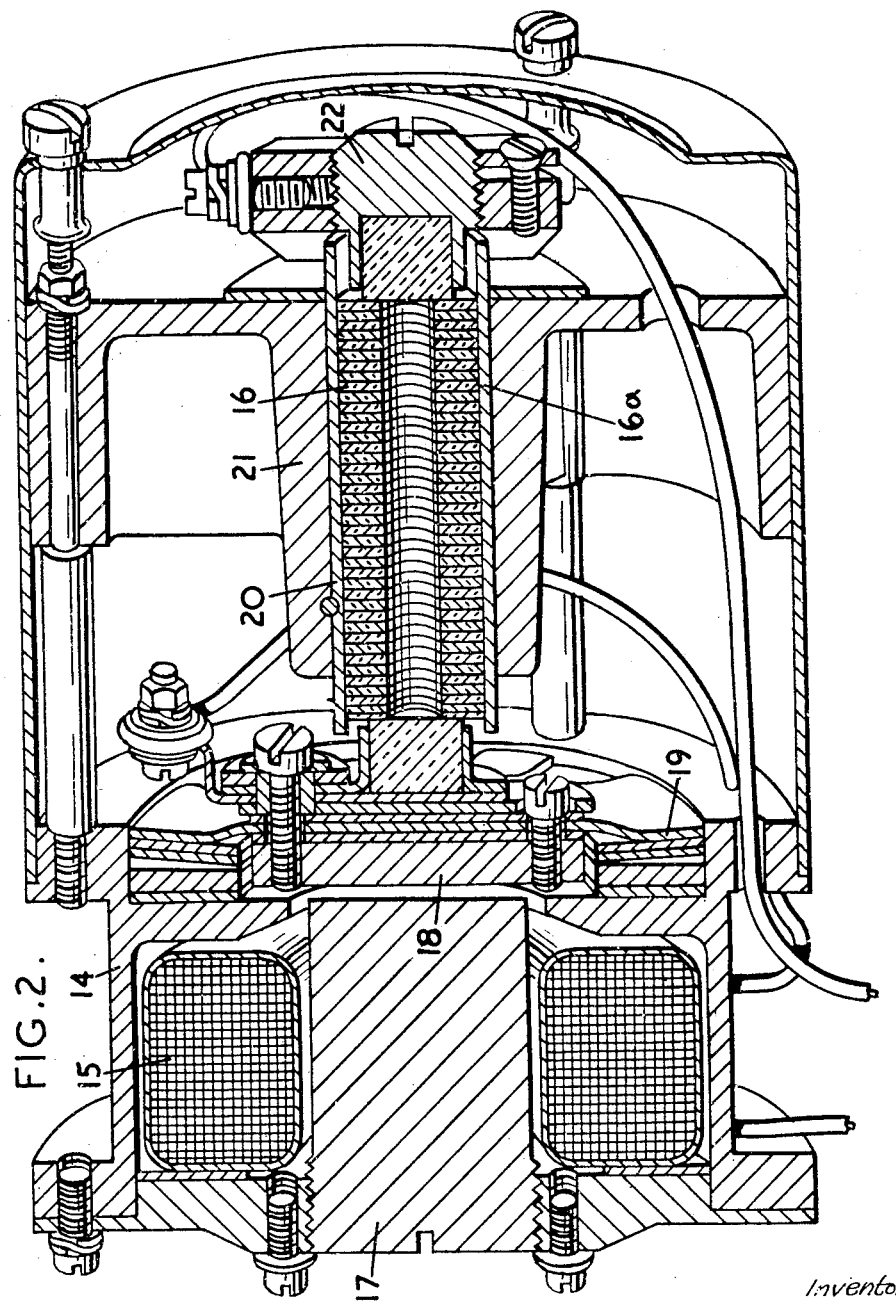

2,498,231

UNITED STATES PATENT OFFICE 2,498,231

CONTROL OF ELECTRIC MOTORS FOR OPERATION OF WING FLAPS OF AIRCRAFT

David Porteous Alexander, Farnborough, England

Application January 10, 1946, Serial No. 640,332
In Great Britain January 10, 1945

4 Claims. (Cl. 318—474)

This invention relates to improvements in the control of electric motors for operating the wing flaps of aircraft.

In general, the control of wing flaps of aircraft is left in the hands of the pilot and he is trained to operate them only when the speed of the aircraft is at or below a safe speed.

In the operation of the wing flaps by electric motors, however, it is desirable to co-ordinate the rate of flap movement with the rate of change of lift, drag and trim of the aircraft and so lighten the pilot's duties. It is highly desirable, therefore, to have a control system which will prevent or limit flap movement when the speed of the machine exceeds the safe limit; and permit the air load acting on the flaps to retract them if the speed limit is exceeded after the flaps have been lowered and to allow the flaps to be relowered automatically when the air speed is reduced to the safe limit if the "flaps down" position has remained selected.

According to the present invention means for electrically operating aircraft wing flaps comprises one or more separately excited reversible D. C. motors actuating the wing flaps through reversible gearing and a current regulator consisting of a resistance and electro-magnetic means, said resistance and electro-magnetic means being so connected in the armature circuit of the motor or motors that the armature current and consequently the torque of the motor or motors is maintained at a predetermined constant value irrespective of line voltage variations and air loads on the flaps. The current regulator comprises a carbon pile resistance adjustably spring loaded to a minimum resistance and an electric magnet whose coil is arranged in series with the carbon pile in the armature circuit of the motor or motors and whose armature is arranged to increase the resistance of the carbon pile in opposition to the spring by reducing the loading between the elements composing the carbon pile. The relationship of the force on the armature due to the magnetic flux of the coil and the force of the spring is such that for a predetermined value of the exciting current the forces are approximately balanced for every position of the armature over its working range. Thus with such a relationship the regulator will automatically adjust the resistance to maintain the current in the coil substantially constant at the predetermined value. Any tendency for the current in the coil to depart from this value will cause a change in the resistance of the carbon pile sufficient to correct for this departure and so maintain the current in the coil and in the armature circuit of the motor or motors substantially constant.

Since the armature current to the motor or motors is substantially constant and the motor or motors is or are separately excited, the torque of the motor or motors will be substantially constant. Under these conditions if an attempt is made to lower the flaps when the aircraft speed is above the safe permissible limit then the motor or motors will be prevented from lowering the flaps or will lower the flaps an amount depending on the aerodynamic torque developed by the air load on the flaps which is opposing the substantially constant torque developed by the motor or motors. If the flaps are being lowered or have been lowered and the aircraft speed increases above the safe permissible limit then the increase in aerodynamic torque developed by the flaps will oppose or overcome the torque developed by the motor or motors and cause the motor or motors to stop lowering the flaps or cause the flap to be retracted and the motor or motors to be driven in the reverse direction until a balance is struck. Conversely if the speed of the aircraft then decreases to or below the safe permissible limit, the motor or motors will lower the flaps. The predetermined value of the current and therefore the torque of the motor or motors can be adjusted by a variable resistance arranged in parallel with the coil of the regulator or by arranging a series of tappings in the coil itself. The value of the controlled current and so the torque of the motor or motors can be varied synchronously with the position of the flaps to counterbalance the increase in aerodynamic torque as the flaps are lowered. A variable resistance connected in parallel with the coil or with the presetting resistance and linked with the flaps can be arranged to vary the value of the controlled current and therefore the torque of the motor or motors according to flap position.

One form of the invention will now be described by way of example only, with reference to the accompanying drawing to which:

Figure 1 is a diagram for electrically operated aircraft wing flaps.

Figure 2 is a section of a current regulator.

In Figure 1 a D. C. electric motor 1 is arranged to operate wing flaps 2 and 3 of an aircraft (not shown) through a reversible gearing 4. The motor 1 is separately excited and is reversible having its field winding 5 connected through a control switch 6 to a D. C. supply 7 through conductors 8, 9 and 10. The armature circuit of the motor 1 is connected to the control switch 6 by conductors 11, 12 and 13.

A current regulator 14 (see Figure 2) has its operating coil 15 and its carbon pile resistance 16 (consisting of carbon elements 16a) connected in series. The coil 15 is arranged on an iron core 17 and an armature 18 of magnetic material (i. e. iron) which is carried on the centre of a disc spring 19, is arranged close to one face of the iron core 17. The carbon pile resistance 16, which is arranged within a ceramic tube 20 carried in a body 21, is held in compression between the disc spring 19 and an adjusting cap 22 secured to the body 21.

The regulator 14 is connected between the conductors 12 and 13 in series with the armature of the motor 1. A variable resistance 23 is arranged in parallel with the operating coil 15. Since the motor 1 is separately excited, the torque developed will be proportional to the armature current. The armature current is, however, regulated by the current regulator 14. The operating coil 15 actuates the armature 18 against the force exerted by the spring 19 which acts to compress the elements 16a forming the pile 16. The relationship of the force on the armature 18 due to the magnetic flux of the coil 15 and the force of the spring 19 is such that for one predetermined value of the exciting current the forces are approximately balanced for every position of the armature 18 over its working range. Thus with such an arrangement the regulator 14 will adjust its resistance automatically to maintain the current in the coil 15 substantially constant at the predetermined value. Any tendency for the current in the coil 15 to depart from the predetermined value will cause a change in the resistance of the pile 16 sufficient to correct for this departure and so maintain the current in the coil 15 and in the armature circuit of the motor 1, substantially constant. The torque of the motor 1 will therefore be substantially constant irrespective of line voltage variations and torque variations due to the air load on the flaps 2 and 3. The predetermined value of the current supplied to the armature of the motor 1 (thus the torque of the motor 1) can be adjusted by the variable or presetting resistance 23 which is arranged in parallel with the coil 15 of the regulator 14. The value of the controlled current can be varied synchronously with the position of the flaps 2 and 3 between the flaps up and flaps down position by the variable resistance 24 connected in parallel with the resistance 23 and coil 15 by conductors 25 and 26 and controlled by a linkage 27 actuated by the flaps 2 and 3. Thus the torque of the motor 1 can be varied from a minimum in the flaps up position to a maximum in the flaps down position to allow for the flap torque increase as the flaps 2 and 3 are lowered. The maximum value must not, however, increase the torque of the motor 1 beyond a value just sufficient to maintain the flaps 2 and 3 in the down position at the highest safe speed for lowering the flaps 2 and 3.

In operation the control switch 6 is actuated to start the motor 1 to lower or raise the flaps 2 and 3. If the control switch 6 has been actuated to lower the flaps 2 and 3 and the speed of the aircraft is above the safe permissible flap lowering speed the motor 1 will attempt to move or move the flaps 2 and 3 an amount depending on the magnitude of the air load on the flaps (flap torque) in relation to the torque of the motors. If the flaps 2 and 3 are being lowered or have been lowered and the speed of the aircraft rises above the safe permissible flap lowering speed, the air load on the flaps 2 and 3 and consequently the flap torque, will increase and oppose or overcome the motor torque causing the motor 1, flaps 2 and 3 to stop moving or cause the flaps 2 and 3 to retract and drive the motor 1 in a reverse direction. If the control switch 6 has not been operated to change the required position of the flaps and the speed of the aircraft then falls to or below the safe permissible speed the motor 1 will relower the flaps 2 and 3.

When more than one motor is provided for lowering and raising the flaps, it will be necessary to include a synchronising system to keep the movement of the motors and flaps synchronised.

The scope of the patent is not determined only by the appendant claims but it extends to and includes all the features hereinbefore described and illustrated in the accompanying drawings.

I claim:

1. Electrical control gear for aircraft-wing flaps comprising a reversible separately excited direct current motor, means including reversible reduction gearing for coupling the motor to the wing flaps of an aircraft, direct current supply leads for the motor armature, a manually operable reversing switch having a "flaps up" and a "flaps down" position interposed between the supply leads and the motor, a carbon pile resistance connected in series between the switch and the motor, spring means acting to compress the carbon pile, an armature on said spring means, and an electromagnet having a winding connected in series with the carbon pile between the switch and the motor and acting on the armature to oppose the action of the spring means on the carbon pile, whereby in operation the current in the winding of the electromagnet and therefore to the motor armature is maintained substantially constant.

2. Electrical control gear for aircraft wing flaps, as claimed in claim 1, wherein an adjustable resistance is connected in parallel with the winding of the electromagnet whereby the extent to which in operation the action of the spring means on the carbon pile is opposed and therefore the value at which the current to the motor is maintained substantially constant is adjustable.

3. Electrical control gear for aircraft wing flaps, as claimed in claim 1, wherein the winding of the electromagnet is tapped and means are provided for connecting different tappings in the switch—carbon pile—motor circuit, whereby the extent to which in operation the action of the spring means on the carbon pile is opposed and therefore the value at which the current to the motor is maintained substantially constant is adjustable.

4. Electrical control gear for aircraft wing flaps, as claimed in claim 1, wherein a variable resistance is connected in parallel with the winding of the electromagnet and means are provided for coupling said variable resistance with the wing flaps for adjustment in accordance with the position of the latter so that the magnitude of said variable resistance is at a maximum when the flaps are up and at a minimum when the flaps are fully lowered, whereby the extent to which in operation the action of the spring means is opposed and therefore the value at which the current to the motor is maintained substantially constant is made dependent upon the position, and thus the air loading, of the flaps.

DAVID PORTEOUS ALEXANDER.

REFERENCES CITED

The following references are of record in the file of this patent:

UNITED STATES PATENTS

| Number | Name | Date |
|---|---|---|
| 425,883 | Hunter | Apr. 15, 1890 |
| 2,411,139 | Roy et al. | Nov. 12, 1946 |